L. R. CULVER.
SPEED ADJUSTER.
APPLICATION FILED OCT. 29, 1908.

922,674.

Patented May 25, 1909.
2 SHEETS—SHEET 1.

L. R. CULVER.
SPEED ADJUSTER.
APPLICATION FILED OCT. 29, 1908.

922,674.

Patented May 25, 1909.
2 SHEETS—SHEET 2.

Lagar R Culver
Inventor
by JM Thomas
his Attorney ically adjustable by

UNITED STATES PATENT OFFICE.

LAGAR R. CULVER, OF SALT LAKE CITY, UTAH.

SPEED-ADJUSTER.

No. 922,674.  Specification of Letters Patent.  Patented May 25, 1909.

Application filed October 29, 1908. Serial No. 460,156.

*To all whom it may concern:*

Be it known that I, LAGAR R. CULVER, a citizen of the United States, residing at Salt Lake City, in the county of Salt Lake and State of Utah, have invented certain new and useful Improvements in Speed-Adjusters, of which the following is a specification.

The object of my invention is to provide a speed adjuster, whereby the speed of the machinery may be changed at will, without disconnecting the power. This I do by the invention illustrated in the accompanying drawings, in which similar letters of reference indicate like parts throughout the several views.

Figure 1:
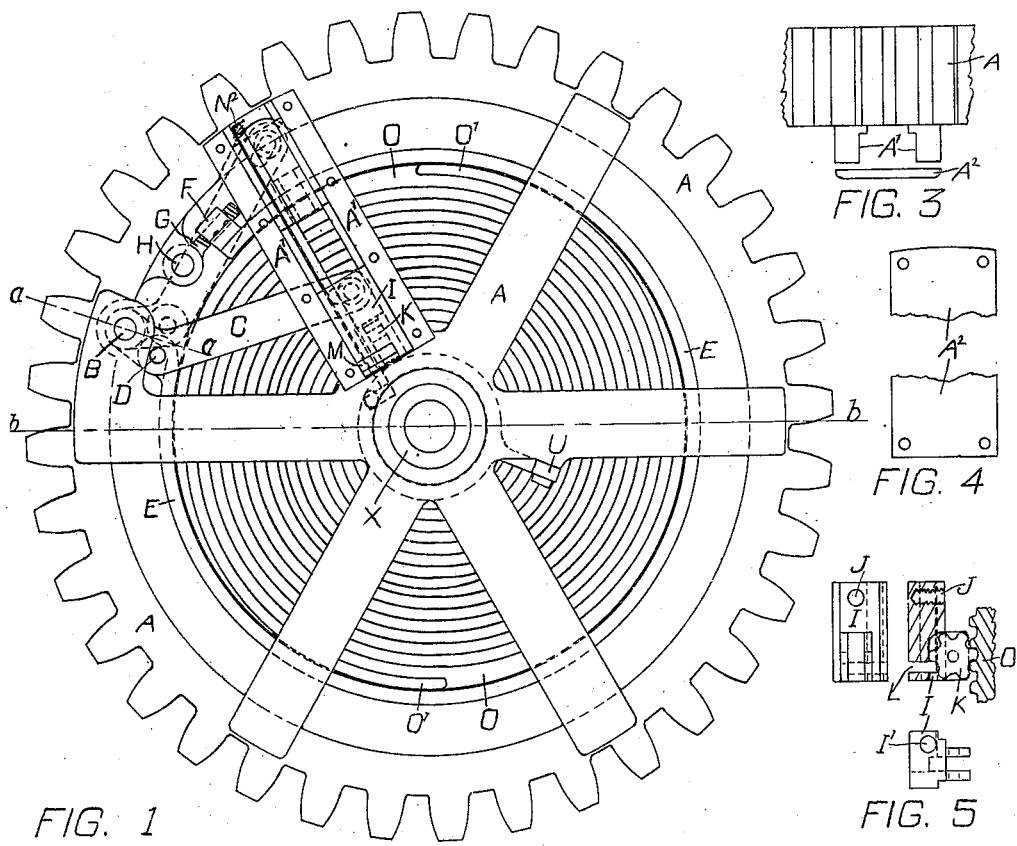
Figure 3:
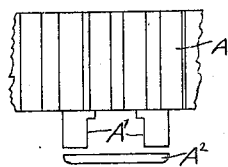
Figure 4:
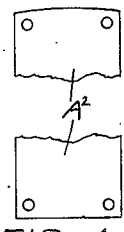
Figure 5:
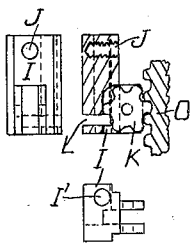
Figure 2:
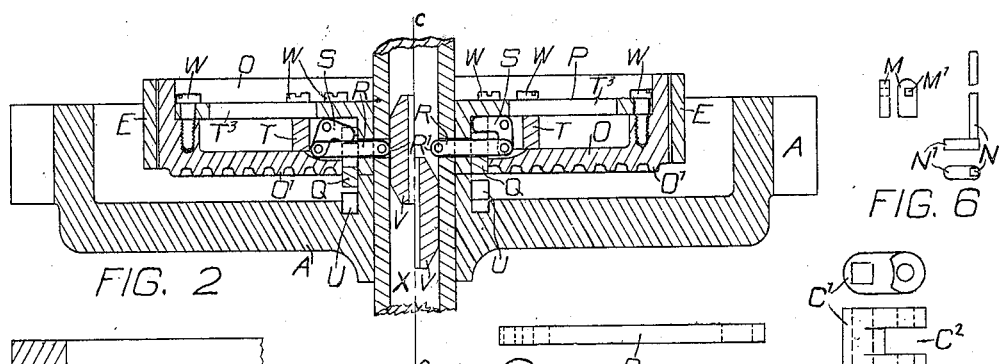
Figure 6:
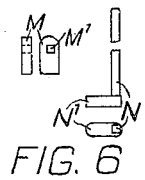
Figures 7, 8:
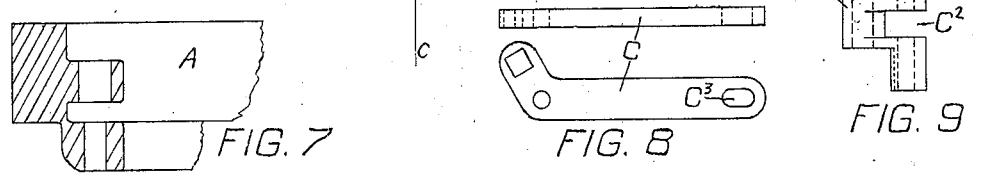
Figure 9:
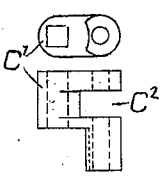
Figure 10:
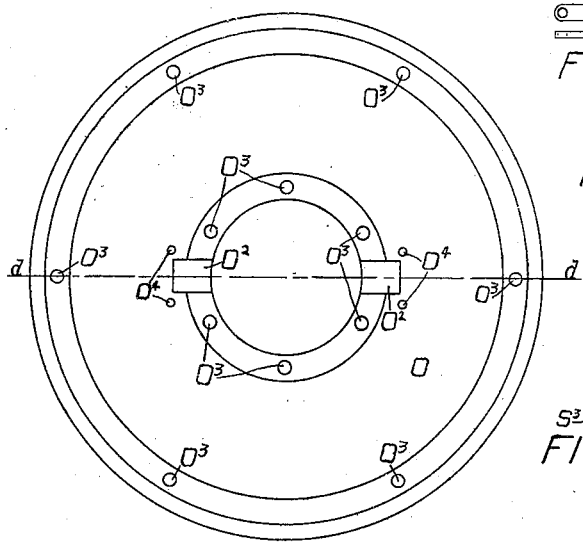
Figure 15:
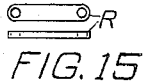
Figure 17:
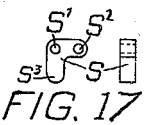
Figure 12:
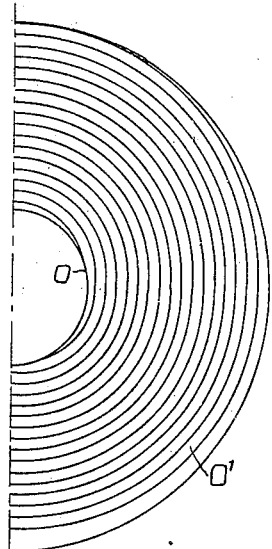
Figure 11:
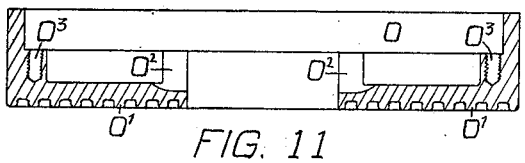
Figure 18:
Figure 19:
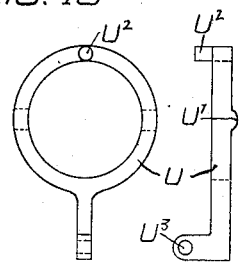
Figure 13:
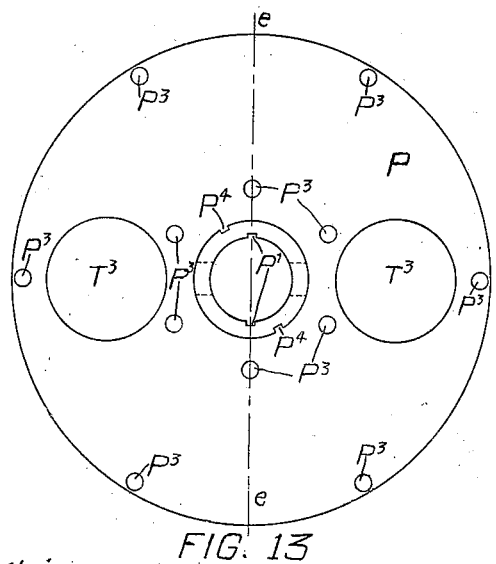
Figure 14:
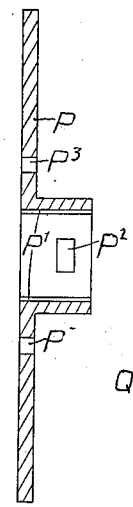
Figure 20:
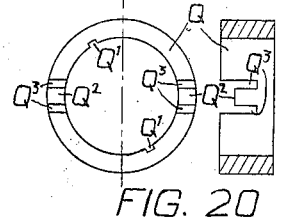

Figure 1 is a plan view of the gear, showing the friction released, and also another position of the connecting lever and end of the friction band dotted in. Fig. 2 is a sectional view of the gear, cut on line $b$, $b$, of Fig. 1, showing the gear released on the right side, and the gear in position to set the friction band on the left side. Fig. 3, is a detailed view of the guides $A^1$. Fig. 4, is a plan of plate $A^2$. Fig. 5, is a detail of the cross head I, and spur gear K. Fig. 6, is a detail of the shaft N, and lever M. Fig. 7, is a section of gear A on line $a$, $a$, of Fig. 1. Fig. 8, is a detailed plan and vertical view of lever C. Fig. 9, is a plan and vertical view of the friction band lever C'. Fig. 10 is a back view of friction disk O. Fig. 11 is a vertical section of disk O, on line $d$, $d$, of Fig. 10. Fig. 12, is a front view of one half of friction disk O, showing the spiral threads, and cut on line $d$, $d$, of Fig. 10. Fig. 13, is a plan view of the hub disk P. Fig. 14, is a vertical section on line $e$, $e$, of Fig. 13. Fig. 15, is a plan and vertical view of thrust bars. Fig. 16, is a plan and side elevation of roller. Fig. 17, is a plan and elevation of the bell crank lever. Fig. 18, shows plan and elevation of bell crank lever bearings. Fig. 19 shows plan and side elevation of yoke or ring U. Fig. 20 shows plan and vertical section of the engaging ring Q.

The gear A has secured in place of one of its spokes, the guides $A^1$, and between them the cross head I is operated. It has therein a hole J, to receive a tap bolt that works in the slot $C^3$ of lever C. This lever C is pivoted by pin B to the gear A, with a short lever $C^1$, as shown in Fig. 9. This lever $C^1$ may be integral with lever C. Secured by pin D to said lever $C^1$ is one end of a friction band E, the other end being adjustably attached by the eye bolt G, through the lug F, on said band E, and is held to the gear A, by pin H, the purpose of this lever C and band E, being that when the outer end of the lever C is moved away from the shaft X of gear A, the band E is tightened and engages by friction the circumferential edge of disk O, that is firmly attached to the shaft X.

The cross head I is held by plate $A^2$, and guided by the guides $A^1$. In Fig. 1 this plate $A^2$ is removed. Within the cross head I, is carried spur gear K, the teeth of which mesh with the spiral threads $O^1$, that are cut on the friction disk O. The shaft N, is formed square, and has attached near one end a lever $N^1$, and fitted on the other end with the spring $N^2$. A slidable lever M, has therethrough near one end a square hole $M^1$. This hole $M^1$ is so formed, that the lever M, is operated, when the said shaft N is turned, and yet allows the lever M, to be freely moved laterally on said shaft N. The lever M, fits within the slot L, of the cross head I, and may be thrown far enough to engage the spur gear K, the object of which will be explained later. The shaft X, is hollowed or bored out, and openings are provided in the side of said shaft X, through which the ends of the thrust bars R, that carry the rollers $R^1$, are inserted. Also within the hollowed or bored out opening of the said shaft X, is operated the plunger V, which plunger V, is so formed that it can be inserted within said hollowed out opening, and will then engage the rollers $R^1$, in the ends of the thrust bars R. The shaft X, has the hub disk P, keyed thereto by a key in the key ways $P^1$, and has openings $T^3$, therethrough for inspecting the smaller parts. The friction disk O, with its spiral thread $O^1$ cut thereon, is bolted to the hub disk P, with the tap bolts W, being inserted into holes $P^3$, and $O^3$. The bearings T, are secured on disk O, by the tap bolts passing through $T^2$, and secured into holes $O^4$, and the bell crank levers S, are fulcrumed in said bearings T, by pins passing through holes $T^1$, and $S^1$. The thrust bars R, which carry the rollers $R^1$, in one end, are pivoted at the other end to one arm of said bell crank levers S, by pin through hole $S^2$. The other arm of said bell crank levers S, marked as $S^3$, comes into contact with the lug $Q^2$, on ring Q, that is keyed to hub disk P, by gib keys through key-ways $Q^1$, and $P^4$. The slots $U^3$, are cut in said ring Q, to allow the operation therein of said thrust bars R.

The ring Q, when moved laterally comes in contact with lugs U¹, that are provided on one side of another ring U, which encircles the hub of gear A, and is pivoted thereon by a pin through hole U³. This ring U, has on the same side as its pivot another lug U². The purpose of this lug U², is to move lever N¹, on the square shaft N, hereinbefore described. Having keyed the ring Q, on the hub disk P, by gib keys which allow lateral motion on said hub, the bearings T, carrying the bell crank levers S, with the thrust bars R, and rollers R¹, are bolted on disk O, then the two disks are bolted together. The plunger V, is pushed into the hollowed out opening of the shaft X, and engages the rollers R¹ in the ends of the thrust bars R, this moves them at right angles to the shaft X. The thrust bars R, move the bell crank levers S, one arm of which levers S, then strikes the lugs Q², of the ring Q. This moves the ring Q, laterally and forces it into contact with the lugs U¹ on one side of the ring U, and moves the ring U, laterally along the shaft X. The lug U², on the other side of said ring U, then moves the lever N¹, on the said shaft N, and turns said shaft. This in turn throws one end of the lever M, around. The said lever M, on being thrown around, will engage one of the teeth on spur gear K, and keep the latter from turning. Now as spur gear K, cannot turn, the spiral threads O¹, will move it away from the shaft X, the gear K, being secured to the cross head, will move it, and as it can only move in a radial line from the shaft X, and as guided by the guides A¹, on the gear A, this will tighten the friction band E, which will cause it by friction to turn the gear A. The whole mechanism will then revolve together and the spur gear K, will not run out any farther. When it is desired to release the friction, the plunger V, is withdrawn, and a spring N², on shaft N, will move the lever M, out and away from gear K, which will allow it to revolve freely, and the tension of band E, as connected to lever C, will bring it, and the cross head I, back to the position shown in Fig. 1, which will release the friction band E. There can be as many of the gears and its mechanism on shaft X as desired. And when so desired and more gears are used, the plunger V, will be provided with a staff long enough to engage the mechanism of any one of said gears. The size of the gear A, and of the gear with which it meshes determines the speed, this invention can be used on a pulley, as well as on a gear.

Having thus described my invention, I desire to secure by Letters Patent, claim:

In a speed adjuster the combination of a hollow shaft, a hub disk keyed thereon, a friction disk with spiral threads cut thereon firmly attached to said hub disk, a spur gear whose teeth mesh with said spiral threads, a cross head that carries said spur gear, a square shaft on which said cross head is operated, and a gear wheel on which said square shaft is mounted, guides for said cross head, a spring on one end and a lever on the other end of said square shaft, a lever movable on said square shaft and fitted within a slot in and carried by said cross head, a ring and yoke carried on said first mentioned shaft, bell crank levers fulcrumed in bearings that are secured on said friction disk, thrust bars carrying rollers pivoted on said bell crank levers, with a plunger fitted to engage said rollers by being inserted within said first mentioned shaft, and a friction band attached to said gear wheel, a lever that is secured on one end of said friction band, and having a slot in the end thereof made to receive a pin in the said cross head.

In testimony whereof I have affixed my signature in presence of two witnesses.

LAGAR R. CULVER.

Witnesses:
  W. E. WOOD,
  A. H. CIELRIGHT.